Dec. 5, 1950     I. J. KRCHMA     2,533,021
SEPARATING METAL HALIDE VAPORS
Filed Feb. 13, 1948
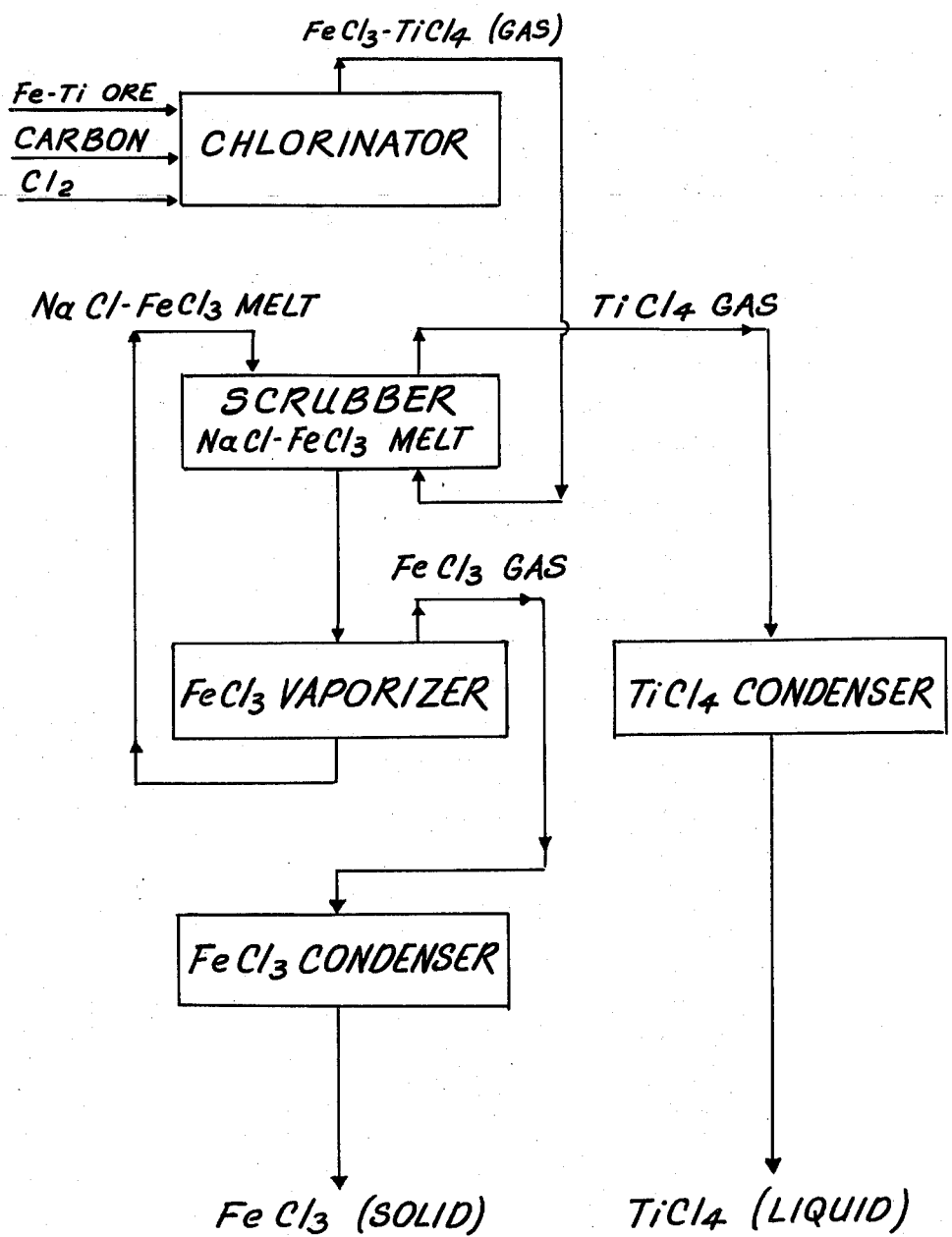
INVENTOR.
IGNACE J. KRCHMA
BY Robert M. McKinney
agent Patented Dec. 5, 1950

2,533,021

UNITED STATES PATENT OFFICE 2,533,021

SEPARATING METAL HALIDE VAPORS

Ignace J. Krchma, Wilmington, Del., assignor to E. I. du Pont de Nemours & Company, Wilmington, Del., a corporation of Delaware Application February 13, 1948, Serial No. 8,303

9 Claims. (Cl. 183—115)

This invention relates to a method for separating and condensing metal halide vapors. Specifically, the invention is directed to the condensation and separation of metal halide vapors such as those resulting from the halogenation of metalliferous ores or other compounds of metals.

Metal halides are common industrial chemicals and are processed for numerous uses. Many commercial chemical methods for the purification or extraction of metal compounds utilize an initial halogenation step, and beneficiation of lean ores by halogenation has become increasingly important. Also, certain metal halides are used industrially for catalytic purposes and others as intermediates for producing salable products. In the preparation and processing of these halides, one often encounters the necessity of condensing and collecting said materials from their vaporous state. Pure normally liquid halides are adequately handled by well known condensing means but, in the heterogeneous systems resulting from commercial halogenation operations, the products are usually composed of both normally liquid and normally solid halides. The method of my invention is directed to the efficient condensation of the normally solid metal halides, or those metal halides which on condensation at ordinary temperature and pressure form a solid. Condensation of these halides by usual means, such as contacting with a cooled surface, has been found to be difficult in practice because the heat transfer surfaces are soon coated with the solid and become inefficient or useless unless cleaned, and also because the solid halides cause severe plugging of condenser lines and chambers.

The halogenation of ferro-titaniferous ores for the recovery of titanium and other values will serve to illustrate the problems involved. Titanium tetrahalides have become increasingly in demand for industrial uses. The most important of these halides, titanium tetrachloride, has been the subject of much attention and searching investigation. Processes have been developed, using TiCl₄, to produce titanium dioxide pigments by wet hydrolysis and by vapor phase oxidation, and titanium metal by reduction with magnesium. The commercial method of manufacture of TiCl₄ consists of the chlorination, at an elevated temperature, of a ferro-titaniferous ore in the presence of a carbonaceous reducing agent. The product gas from the chlorination operation, consisting of metal halides and normally non-condensible gases, must be cooled to remove the latent heat in the gases and the heat of condensation of the liquid and solid products. The condensation and recovery of these products are attended by severe difficulties as evidenced by prior art processes. When fractional condensation of the vapors is attempted by known means, solid mixtures of ferric chloride, with minor amounts of ferrous chloride, form and grow to sufficient size to cause partial or complete plugging of condenser lines and chambers. This growth is very firm, requiring effective force to dislodge and constant attention and effort to prevent complete shutdown of the operation. Continuous operation of the chlorination system is thus quite difficult.

Attempts have been made to alleviate these difficulties in prior art processes, among which are: condensation of all or part of the titanium tetrachloride with the ferric chloride to produce a flowable mass; condensation by spray quenching with titanium tetrachloride, silicon tetrachloride, or carbon tetrachloride; and mechanical scraping of equipment parts. Further difficulties are encountered in some prior condensation operations because fine solids are carried over into other parts of the condensing equipment. These fine particles settle and cover heat transfer surfaces with an insulating layer of solids, thereby severely decreasing heat transfer efficiency. Similar problems are also encountered in the condensation of the products from the halogenation of other ores, and in other operations wherein vapors of normally solid metal halides are produced or handled.

One of the objects of this invention is to provide a method for overcoming the plugging difficulties heretofore found in condensing and collecting metal halides which on condensation from their vaporous state form solid phases. Another object is to provide a method wherein good heat transfer efficiency for the condensation operation is realized. A further object is to fractionally condense metal halide components from vaporous mixtures. A specific object of this invention is a method to fractionally condense vaporous ferric chloride from the product gases resulting from the chlorination of materials containing iron and titanium.

The above and other objects are realized by my invention which comprises contacting or washing the vapors containing the metal halides with a molten salts heat exchange and solvent medium. In the following discussion and the appended claims, by "molten salts medium," I mean a metal salts composition, fluid in the operating temperature range and made up of two or more anhydrous metal salts, mutually soluble, at least one of which is the same compound as the halide to be collected and all of which individually would be solid at ordinary temperatures.

The method of my invention may be more fully understood by illustrating its application to the condensation of products from the chlorination of a ferro-titaniferous ore. The vaporous products of the chlorination consisting, in the main, of titanium tetrachloride, ferric chloride, chlorine, carbon monoxide, carbon dioxide, and in some instances nitrogen, are contacted, washed or scrubbed with a molten salts medium in an absorption tower. A suitable molten salts medium for this operation comprises a solution of about 78% ferric chloride and about 22% sodium chloride (by weight). A preferred method of operation is to conduct this contracting step in a countercurrent fashion. The vaporous chlorination products enter the contacting unit near the base at a temperature within the range of about 700° to about 1000° C., and rise up through the downward flowing fluid medium to exit at a temperature not below 160° C. In the contacting or absorbing unit, condensible metal chlorides are removed from the chlorination product gas due to solubility of the same in the molten salts medium. The gas is also washed essentially free of entrained solids which are not soluble in the medium (e. g. unreacted ore and coke particles, etc.). The molten salts medium enters the contacting unit at a temperature slightly lower than the gas exit temperature and leaves the unit at a higher temperature because of the heat absorbed during the cooling and condensation of the products. The gas leaving the contacting unit contains the titanium tetrachloride, which has a normal boiling point of 136.4° C., and the normally non-condensible gases, i. e., nitrogen, chlorine, carbon monoxide, carbon dioxide etc. The gas is further treated in a water-cooled and/or refrigerated condensing system to remove the titanium tetrachloride. The molten salts medium removed from the base of the contacting unit may be subsequently treated to separate the collected metal halides, and the medium recycled to the contacting unit for reuse. This combination of operations effectively separates the chlorination products in to the desired fractions one containing the normally solid halides and the other the titanium tetrachloride.

In the above outlined operation wherein the vaporous chlorination products are contacted or scrubbed with a liquid or molten solvent medium, the normally solid chloride, i. e., ferric chloride, is dissolved in the solvent medium to increase the ferric chloride content of the same. Simultaneously, the medium becomes leaner in sodium chloride and becomes heated due to the absorption of heat from the chlorination gases. The effectiveness of the molten salt medium as a solvent for the ferric chloride is diminished as the temperature and ferric chloride content of the molten salt increase, and one must regulate the flow of the solvent medium to realize the complete absorption of the ferric chloride and its removal from the titanium chloride-containing chlorination gases. If sufficient contact is provided, the whole of the ferric chloride dissolves in the solvent salt medium (unless too high a temperature prevails and in that event the ferric chloride salt medium will reach an equilibrium state with gaseous ferric chloride). In this particular embodiment of this invention (NaCl—FeCl₃ salt medium for removal of FeCl₃ from gases), one may well maintain the salt medium at a temperature below about 200° C. and preferably from about 160° C. to 250° C. The exit gases from which the ferric chloride has been extracted will approach this temperature range 160 to 250° C.) due to the efficient heat exchange that may be had in countercurrent absorption systems. This temperature is above the dew point of the normally liquid halide, and this is an essential of the process.

The ferric chloride may be recovered from the molten salts medium by heating some to volatilize a portion of the iron compound, and the vapors may be condensed in suitable equipment to recover it in its pure anhydrous condition. The residual salts medium is then recycled in the system for the removal and recovery of further quantities of this commodity. This recycling and reuse of the spent solvent salts medium may be adopted at the option of the operator of the process and will doubtlessly be guided by economic considerations.

The accompanying schematic drawing is a flow sheet illustrative of one embodiment of my invention for separating and condensing a vaporous metal halide from the halogenation of a metalliferous ore. Referring to the drawing, a vaporous mixture of, for example, TiCl₄ and FeCl₃ obtained from the chlorination of a ferro-titaniferous ore is passed from a chlorinator into a suitable scrubber or absorption unit, in which the mixture is brought into contact with, for instance, a ferric chloride-sodium chloride solution, such as the type above referred to and which is maintained at a temperature below about 200° C. or the dew point of TiCl₄. As a result, and due to the solubility of FeCl₃ in the molten salts contacting medium, condensable FeCl₃ is removed from the mixture under treatment and is withdrawn to a vaporizer wherein a portion of the iron compound in the effluent becomes vaporized, is then passed to a condenser, and subsequently recovered in pure, anhydrous condition. Residual salts regenerated in the FeCl₃ vaporizer are recycled to the scrubber for reuse in the system in further recovery operations. Vaporous TiCl₄ separated out in the scrubber is fed from that unit to a water-cooled or refrigerated condenser in which removal of incondensable waste gases present in the TiCl₄ is effected and recovery afforded of the final pure TiCl₄ product.

My invention acts to avoid the solid deposits of the prior art and the difficulties associated therewith by converting the solid phases into a liquid phase by means of the molten salts medium. Small amounts of insoluble solids, present in the product gas, are also effectively carried from the contacting unit by the fluid medium. The condensation of normally solid halides from the vapor to the liquid form by controlling the condensation temperature is very difficult because many of the halides have a very short liquidus range and tend to sublime. The mechanics of the heat and temperature control for such an operation are also no small task. The liquidus range may be extended greatly by the use of a molten salt. For example, ferric chloride which melts under pressure at about 285° C. may be combined with sodium chloride, melting point 801° C., to give compositions melting as low as 158° C. and up to near the melting point of sodium chloride. Furthermore, the solvent salts reduce the vapor pressure of the solute salt so that operations may be conducted far above the boiling or subliming point of the solute salt, were it present alone. A typical case is that of BeCl₂ which boils at 488° C. but can be readily handled in a molten salt medium of BeCl₂ and NaCl even at 700° C., without excessive losses of beryllium.

Specific compositions of molten salts medium will depend upon a number of variables, among which are: temperatures of operation and condensation, solubilities and melting points of the mixtures of collected halides and molten salts, vapor pressures of salts and metal halides, and economic considerations. In general, components selected from the anhydrous alkali metal and alkaline earth halides may be combined with an initial amount of the halide to be collected to produce an acceptable composition. Eutectic compositions of these halides, such as given in the following table, are also useful components for a solvent medium.

| Components | Approx. Mol. percent | M. P., °C. |
|---|---|---|
| KCl/NaCl | 42.5/57.5 | 355 |
| NaCl/LiCl | 28.5/71.5 | 552 |
| BaCl$_2$/KCl | 57/43 | 644 |
| CaCl$_2$/LiCl | 61.8/38.2 | 496 |
| KF/LiF/NaF | 45/45/10 | 454 |
| KF/LiF | 50/50 | 492 |
| LiBr/LiCl | 75/25 | 522 |

Operable compositions are also found in low melting combinations of normally solid metal salts such as anhydrous salts of Cu, Ag, Zn, Pb, Fe, Co, Ni and the like which produce melts having the desired non-reactive and solvent properties. The medium should be essentially unreactive with and not decomposed by the halides and halogen in the vapors to be treated.

The heat to be removed from the gases during the condensation operation may be transferred by various means. Heat transfer surfaces may be installed in the contacting unit and a heat transfer fluid used. More suitably, the heat may be removed by allowing the molten salts medium to increase in temperature and later remove this heat by passing the medium through a heat exchanger. The fluidity of the molten salts insures that heat transfer surfaces are kept free of insulating layers of solids and this aids in increasing heat transfer efficiency. In any event, the transfer of heat is highly efficient because of the large amount of surface available and the intimate contact between heat donor and acceptor when the molten salts medium is used.

The contacting operation may be carried out in any of the well known absorption apparatus, such as a spray scrubbing tower, a bubble cap plate system, packed tower, or mechanical contacting unit; or the gases may simply be passed over or through a bath of the medium. It is preferable to conduct the contacting operation in a countercurrent manner because of more favorable absorption driving forces. By driving force, I mean the difference between the partial pressure of a component in the gas and the vapor pressure of the same component from the molten salts medium. The countercurrent operation also is more acceptable because the gases leaving the contacting tower encounter fresh and cooler medium and therefore are more completely freed of condensible metal halides. These effective features of a countercurrent system do not bar the operation of a co-current system which, in some case, may be desirable, especially where the heat to be transferred is small, the driving forces available for absorption are large, or the design or operation of the equipment are facilitated.

Removal of the absorbed metal halides from the used medium may be accomplished, especially if the medium is to be recycled. This recovery of the collected metal halides may be attained by well known means: e. g. heating to vaporize the desired halide, cooling to crystallize it out, electrolysing the system to produce metals and halogen gas, etc.

From the many possible applications of my invention, the following example is given as an illustration of the mode of operation and is intended in no way to limit the scope of the appended claims.

*Example*

A chlorination operation was conducted using a fluidized solids ore and coke bed, the ore being a ferro-titaniferous type containing 60% $TiO_2$ with the remainder mainly iron oxides. The hourly reactant charging rates were 2 lbs. of the ore, 0.4 lb. of coke, and 16.4 cubic feet (S. T. P.) of chlorine. This chlorination operation was carried out at a temperature of about 850° C. in a 2 inch diameter by 6 foot tall silica tube enclosed in an electrically heated furnace. A product gas was obtained having the following average composition:

Per cent by volume
$TiCl_4$ ------------------------------------ 23.7
Ferric chloride ---------------------------- 14.7
Chlorine ----------------------------------- 6.9
Carbon dioxide ---------------------------- 43.8
Carbon monoxide -------------------------- 10.9

This gas left the chlorination reactor at a temperature of about 850° C. and entered the base of the contacting or absorbing tower, a 2 inch diameter by 3 foot tall stainless steel tube fitted with gas and molten salts medium entrance and exit lines. About 17 pounds per hour of a eutectic mixture of NaCl and $FeCl_3$, containing about 78% $FeCl_3$ and 22% NaCl by weight, at a temperature of about 170° C., were sprayed into the top of the tower. The tower contained splash and distributor plates to insure intimate contact between the gas and the molten salts medium. The amount of eutectic fluid was regulated to maintain its exit temperature at about 375° C., at which rate the gas exit temperature was about 175° C. The molten salts effluent was separately treated by heating to remove about 1.4 pounds per hour of the ferric chloride. The regenerated molten salts medium was then cooled to about 170° C. and returned to the contacting tower for reuse.

The gases leaving the top of the contacting tower were passed through a water cooled condenser and then a refrigerated brine cooled condenser to condense most of the titanium tetrachloride and separate it from the normally noncondensible waste gases. About 2.6 lbs. of $TiCl_4$ were collected per hour.

The effectiveness of my invention is apparent when the ease of condensation and collection of the ferric chloride and the freedom from plugging difficulties are considered. In the above example, the solids were collected in solution form and the fluid flowed freely down through the contacting chamber. The convenience of this method was also evident from the example, because a separation of undesirable contaminants of the $TiCl_4$ was accomplished. Fine solid particles traveling with the product gases were effectively removed by passage through the down-flowing fluid medium. The collection efficiency of this operation was excellent because the vapor pressure and volatility of ferric chloride from the eutectic composition of NaCl and $FeCl_3$ was extremely low, producing an effective driving force to remove the ferric chloride from the vapor.

In the example, the halides were chlorides but the method is also equally operable where the halides are bromides, iodides or fluorides. Likewise, other vaporized mixtures of halides such as chromium chloride and silicon or stannic chlorides, etc., may be fractionally condensed by proper selection of the molten salts medium and the operating temperature range, so that the lower boiling liquid halide remains in the gas phase and the normally solid halide is condensed. Zirconium chloride resulting from the chlorination of zircon may be collected separately from the $SiCl_4$, also produced, by means of such a molten salts technique.

Generally, my invention may be utilized to condense normally solid metal halides from a vaporous mixture and to separate said halides from the undissolved and more volatile materials present. It is obvious that the method may be applied to hot vapors containing normally solid halides which result from any operation and is not limited to treatment of a halogenation process product gas.

I claim:

1. A method of separating the components of a vaporous mixture of normally solid and normally liquid metal halides which comprises scrubbing the hot vaporous mixture with a mixture of cooler molten metal halides mutually-soluble in each other, individually solid at ordinary temperatures, inert towards the vaporous mixture and at least one of which has the same chemical composition as the normally-solid metal halide in the mixture under treatment, and thereafter collecting the less volatile normally solid metal halides fraction in the molten metal halide mixture and leaving the more volatile halides fraction as vapor.

2. A method of separately condensing iron chloride from a vaporous mixture of iron chloride and titanium chloride which comprises scrubbing said vaporous mixture at a temperature above about 160° C. with a mixture of molten iron chloride and sodium chloride, and after said scrubbing collecting the iron chloride in the said molten mixture while the titanium tetrachloride remains in its vaporous state.

3. A method of separately condensing chromium halides from a vaporous mixture of chromium halide and more volatile halides which comprises scrubbing said vaporous mixture with a mixture of molten mutually-soluble metal halides which are individually solid at room temperature, inert towards the vaporous mixture being treated and at least one of which has the same chemical composition as the chromium halide being condensed, and after said scrubbing retaining the chromium halide in the molten salts medium and leaving the more volatile halides in the vaporous condition.

4. A method of separately condensing zirconium chloride from a vaporous mixture of zirconium chloride and silicon tetrachloride which comprises scrubbing said vaporous mixture with a mixture of molten mutually-soluble metal halides which are individually solid at room temperature, inert towards the vapor mixture being treated and at least one of which has the same chemical composition as the zirconium chloride being condensed, and after said scrubbing collecting the zirconium chloride in the molten salts medium and leaving the silicon tetrachloride in the vapor.

5. A method for the separation of normally solid from normally liquid metal halides which comprises contacting a hot gaseous mixture of said halides with a molten mixture of mutually-soluble metal halides which are individually solid at room temperature, inert towards the vaporous mixture being treated, and at least one of which has the same chemical composition as the normally-solid halide being separated, and which acts both as a solvent for the normally solid halide and as a cooling agent, separating the molten metal halide mixture containing the normally solid metal halide from the cooled gas containing the normally liquid metal halide and subsequently distilling the normally solid metal halide from the molten salts medium for its recovery in the substantially pure state.

6. A method for fractionally condensing a normally-solid metal halide from a vaporous mixture thereof with another halide which comprises contacting said mixture with a mixture of molten, mutually-soluble metal halides which are individually solid at room temperature, inert towards the vaporous mixture being treated, and at least one of which has the same chemical composition as the halide being fractionally condensed.

7. A method for fractionally condensing a normally-solid metal halide from its vaporous mixture with another normally-liquid metal halide which comprises contacting said mixture at a temperature above the dew point of the normally-liquid halide with a mixture of molten, mutually-soluble metal halides which are individually solid at ordinary temperature, inert towards the vaporous mixture being treated and at least one of which has the same chemical composition as the halide being fractionally condensed, and thereafter condensing the normally-liquid halide from the remaining vapor in a separate condensation zone.

8. A method for separating the components of a vaporous mixture of normally-solid and normally-liquid metal halides which comprises scrubbing the hot, vaporous mixture, while at a temperature above the dew point of the normally-liquid metal halide present in said mixture, with a mixture of cooler, anhydrous metal halides, mutually soluble in each other, at least one of which is the same compound as the normally-solid halide being separated and all of which are individually solid at ordinary temperatures, and subsequent to said scrubbing treatment removing said molten metal halide mixture from the scrubbing zone and distilling therefrom its normally-solid metal halide component for recovery in the substantially pure state.

9. A method for separately condensing iron chloride from a vaporous mixture of iron chloride and titanium tetrachloride which comprises scrubbing said vaporous mixture at a temperature above about 160° C. with a eutectic mixture of iron chloride and sodium chloride, and after said scrubbing treatment condensing the titanium tetrachloride from the treated vapors in a separate condensing zone.

IGNACE J. KRCHMA.

REFERENCES CITED

The following references are of record in the file of this patent:

UNITED STATES PATENTS

| Number | Name | Date |
|---|---|---|
| 2,306,184 | Pechukas | Dec. 22, 1942 |
| 2,344,319 | Meister | Mar. 14, 1944 |
| 2,396,458 | Cole | Mar. 12, 1946 |

FOREIGN PATENTS

| Number | Country | Date |
|---|---|---|
| 547,005 | Great Britain | Aug. 10, 1942 |
| 550,750 | Great Britain | Jan. 22, 1943 |
| 551,525 | Great Britain | Feb. 26, 1943 |